(12) United States Patent
Fukano et al.

(10) Patent No.: US 6,450,543 B1
(45) Date of Patent: Sep. 17, 2002

(54) TUBE CONNECTION STRUCTURE OF FLUID PRESSURE-OPERATED APPARATUS

(75) Inventors: Yoshihiro Fukano; Tetsuro Maruyama, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,757

(22) Filed: Dec. 16, 1999

(30) Foreign Application Priority Data

Dec. 24, 1998 (JP) ............................................ 10-368041

(51) Int. Cl.⁷ ............................ F16L 47/02; B29C 65/02
(52) U.S. Cl. .................... 285/21.1; 285/331; 285/423; 285/21.3
(58) Field of Search ................................ 285/331, 423, 285/21.1, 21.3

(56) References Cited

U.S. PATENT DOCUMENTS

| 2,933,428 A | * | 4/1960 | Mueller ..................... 285/21.1 |
| 5,078,433 A | * | 1/1992 | Morse et al. ............... 285/331 |
| 5,224,738 A | | 7/1993 | Taga |
| 5,336,351 A | | 8/1994 | Meyers |
| 5,951,060 A | | 9/1999 | Fukano et al. |
| 5,996,636 A | | 12/1999 | Fukano et al. |
| 6,045,164 A | * | 4/2000 | Nishio ........................ 285/331 |
| 6,089,621 A | * | 7/2000 | Nishio ........................ 285/331 |

FOREIGN PATENT DOCUMENTS

| EP | 0 786 324 | | 7/1997 | |
| JP | 404370494 | * | 12/1992 | ................ 285/21.1 |
| JP | 405203092 | * | 8/1993 | ................ 285/21.1 |
| JP | 6-174171 | | 6/1994 | |
| JP | 2562781 | | 9/1996 | |

* cited by examiner

Primary Examiner—Eric K. Nicholson
(74) Attorney, Agent, or Firm—Oblon, Spivak, McClelland, Maier & Neustadt, P.C.

(57) ABSTRACT

An insert section of an insert member is inserted into a tube member in a state in which the insert member is detached from a recess to form a diametrally expanded section on the tube member. Subsequently, the insert member is fitted to the recess to install the tube member to the recess. At this stage, an outer circumferential surface of an expanded section of the insert member tightly contacts with an inner circumferential surface of the recess to effect the sealing function. Subsequently, a tapered section and an outer circumferential surface of the tube member are resin-welded by using a welding material. Thus, the tube member is prevented from disengagement from a body.

7 Claims, 10 Drawing Sheets

BACKGROUND ART

US 6,450,543 B1

1

TUBE CONNECTION STRUCTURE OF FLUID PRESSURE-OPERATED APPARATUS

BACKGROUND OF THE INVENTION

1. Field of the Invention

The present invention relates to a tube connection structure for connecting a tube member formed with a passage for introducing and discharging a fluid, to a fluid pressure-operated apparatus such as an ON/OFF valve and a cylinder.

2. Description of the Related Art

Conventionally, the fluid pressure-operated apparatus such as an ON/OFF valve and a cylinder is provided with a tube connection structure for connecting a tube member. Such a tube connection structure is exemplified by a connection structure for a resin tube, as disclosed in Japanese Patent No. 2562781.

Figure 10:
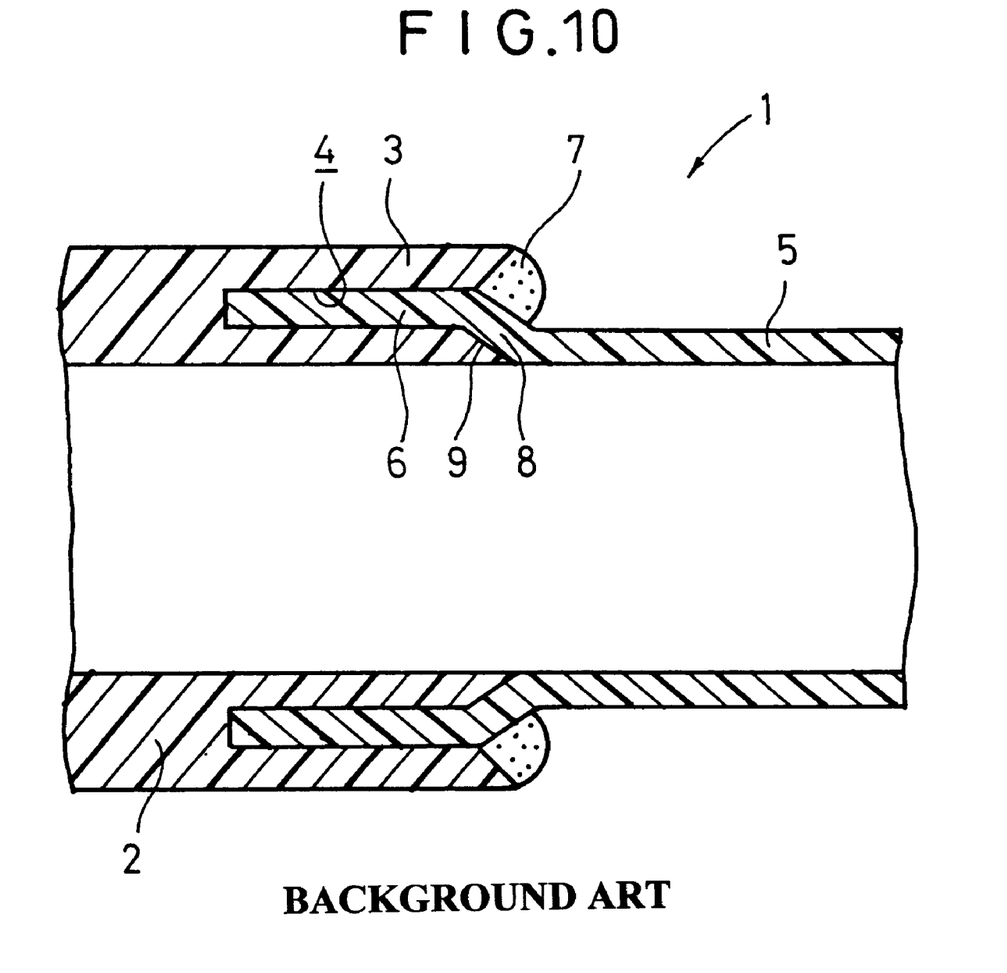
FIG. 10 shows a longitudinal sectional view, with partial omission, illustrating a resin tube connection structure concerning the conventional technique.

As shown in FIG. 10 the connection structure 1 comprises a cylindrical projection 3 which is disposed at an end of a cylindrical main joint body 2 and which extends along an outer circumferential surface of the main joint body 2. An annular long groove 4 is formed between the cylindrical projection 3 and the outer circumferential surface of the main joint body 2. A diametrally expanded section 6 is formed at an end of a resin tube 5 which is a tube member. The diametrally expanded section 6 is forcibly inserted into the annular long groove 4, and an end of the cylindrical projection 3 and an outer circumferential portion of the resin tube 5 are welded by using a resin material 7. Thus, the main joint body 2 and the resin tube 5 are fixed. The main joint body 2 and the resin tube 5 are sealed by an inner circumferential surface of a rising section 8 of the diametrally expanded section 6 and a tapered surface 9 of the main joint body 2 corresponding thereto.

However, the connection structure 1 for the resin tube concerning the conventional technique described above adopts a method in which the resin tube 5 is directly installed to a main fluid pressure-operated apparatus body. It is impossible to confirm the amount of insertion of the diametrally expanded section 6 of the resin tube 5 with respect to the annular long groove 4. For this reason, any dispersion occurs in the amount of insertion of the diametrally expanded section 6. Therefore, if the diametrally expanded section 6 is not sufficiently inserted into the annular long groove 4, the sealing is incomplete between the tapered surface 9 of the main joint body 2 and the rising section 8 of the resin tube 5. It is feared that the fluid, which flows through the inside of the resin tube 5, leaks out to the outside through any gap formed between the tapered surface 9 and the rising section 8.

Further, it is difficult to confirm whether or not the diametrally expanded section 6 of the resin tube 5 is uniformly formed in the circumferential direction. If the diametrally expanded section 6 is not formed uniformly, then any gap is formed between the rising section 8 and the tapered surface 9, and the sealing is incomplete. Also in this situation, a problem arises in that the fluid leaks out.

SUMMARY OF THE INVENTION

A general object of the present invention is to provide a tube connection structure of a fluid pressure-operated apparatus, which makes it possible to improve the operability to connect a tube member, and which makes it possible to reliably avoid any occurrence of defective sealing.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The tube connection structure of the fluid pressure-operated apparatus according to the present invention will be explained in detail below with reference to the accompanying drawings, as exemplified by preferred embodiments.

Figure 1:
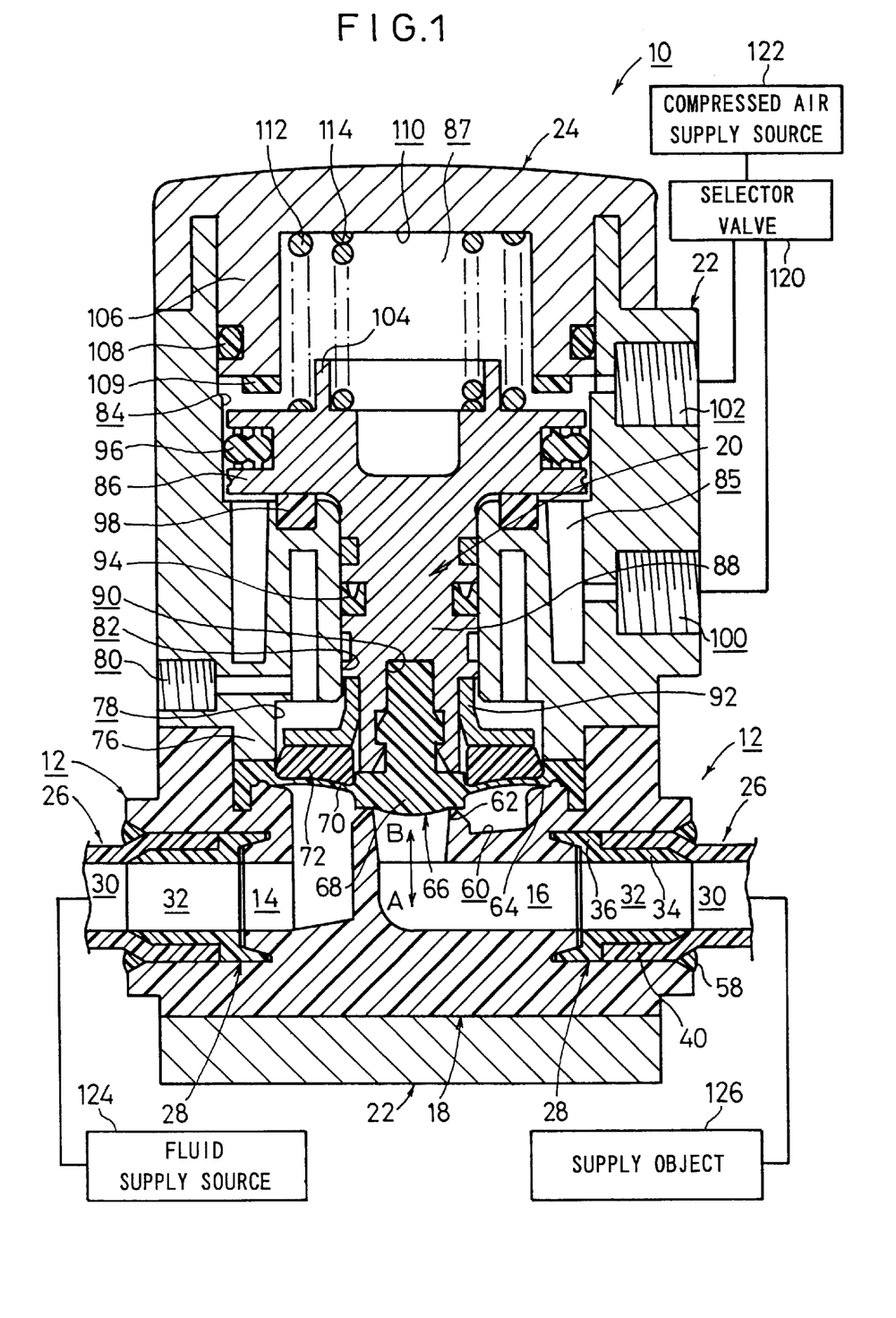
FIG. 1 shows a vertical sectional view illustrating an ON/OFF valve to which a tube connection structure of a fluid pressure-operated apparatus according to a first embodiment of the present invention is applied.

With reference to FIG. 1, reference numeral 10 indicates an ON/OFF valve to which a tube connection structure 12 of a fluid pressure-operated apparatus according to the first embodiment of the present invention is applied. The ON/OFF valve 10 comprises a body 18 which has fluid passages 14, 16 and which is formed of a resin material, a casing 22 which surrounds the body 18 and which contains a valve plug 20, and a cover member 24 which closes an upper portion of the casing 22.

Figure 2:
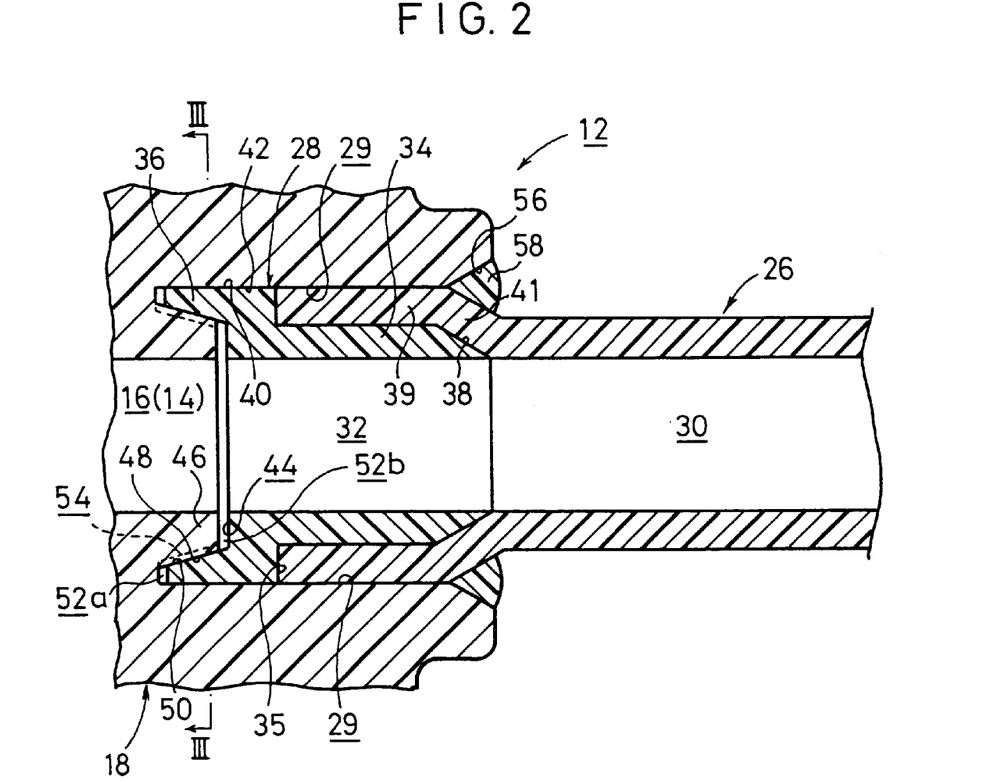
FIG. 2 shows a magnified longitudinal sectional view, with partial omission, illustrating the tube connection structure shown in FIG. 1.
Figure 3:
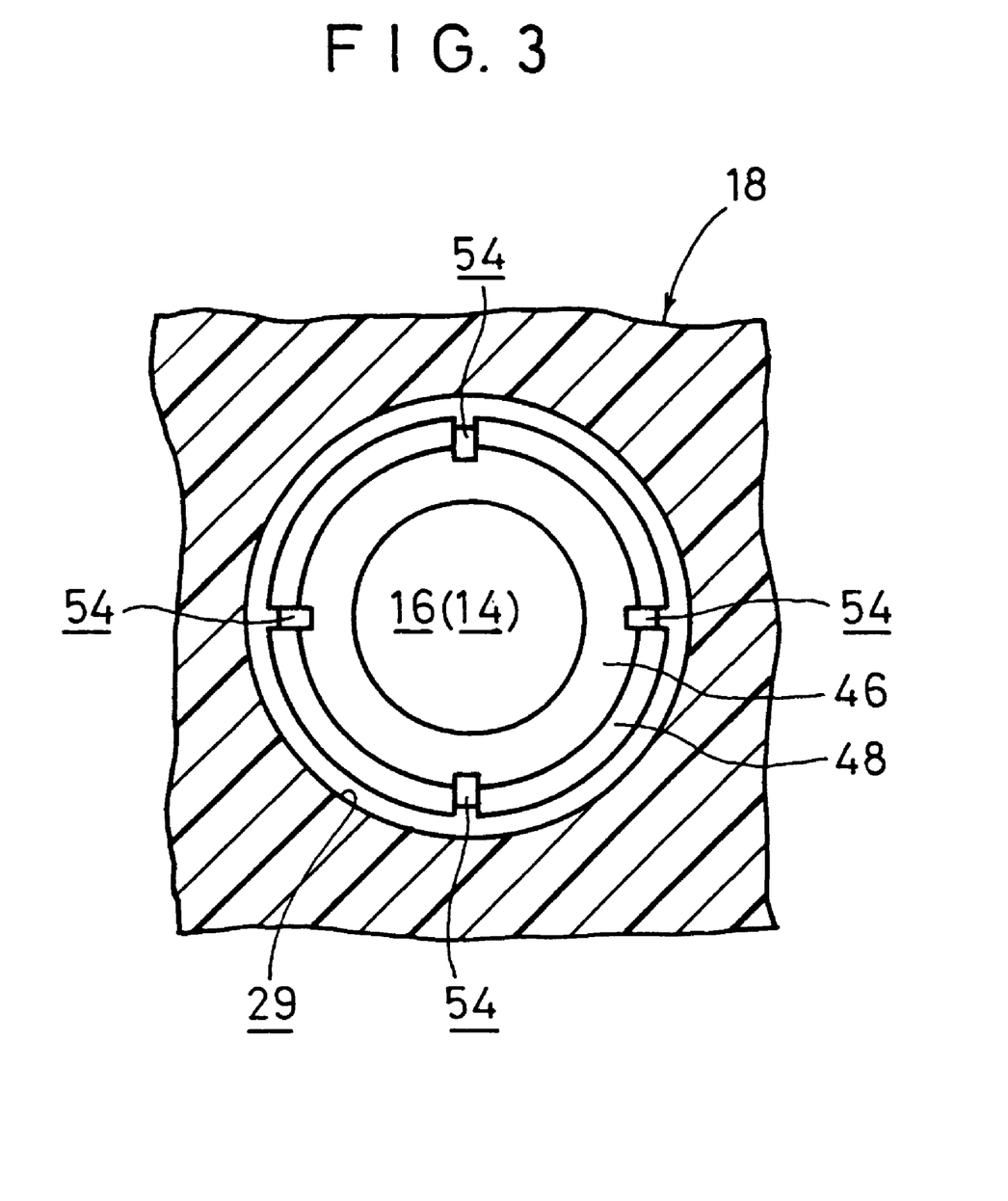
FIG. 3 shows a vertical sectional view taken along a line III—III shown in FIG. 2.

A tube connection structure 12 is provided at an opening of each of the fluid passages 14, 16. As shown in FIG. 2, the tube connection structure 12 includes an insert member 28 which is inserted into an end of a tube member 26 composed of, for example, a tube made of a resin material. The insert member 28 is fitted to a recess 29 which is formed on the body 18 and which communicates with the fluid passage 14, 16. An annular projection 46 is formed on a side wall of the recess 29. As shown in FIG. 3, a plurality of grooves 54 are formed on an inclined wall 48 which constitutes an outer circumferential surface of the annular projection 46.

The inner member 28 is formed to have a substantially cylindrical configuration, and it is formed with a passage 32 which communicates with the fluid passage 14, 16 and with a passage 30 of the tube member 26. An insert section 34, which is inserted into the tube member 26, is formed on a first end side of the insert member 28. An expanded section 36, which is formed with a step section 35 to expand radially outwardly, is formed on a second end side of the insert member 28. A tapered section 38 is formed on the outer circumference at the end of the insert section 34.

When the insert member 28 is inserted, a diametrally expanded section 39 is formed at the end of the tube member 26 by expanding the diameter by the tapered section 38. Alternatively, the diametrally expanded section 39 may be previously formed at the end of the tube member 26, and then the insert section 34 of the insert member 28 may be inserted thereinto. An inclined section 41 is formed at an intermediate portion of the tube member 26 corresponding to the tapered section 38.

An outer circumferential surface 40 of the expanded section 36 tightly contacts with an inner circumferential surface 42 of the recess 29. Accordingly, the outer circumferential surface 40 and the inner circumferential surface 42 function as sealing sections disposed substantially in parallel to the axis of the insert member 28. A recess 44 is formed at an end of the expanded section 36. An annular projection 46 is fitted to the recess 44. When an inclined wall 48 of the annular projection 46 abuts against a wall 50 of the recess 44, clearances 52a, 52b are formed between the body 18 and the expanded section 36 except for the portion disposed between the wall 48 and the wall 50. The respective clearances 52a, 52b communicate with each other via a groove 54 formed on the wall 48. Therefore, the sealing is not effected in a direction of intersection with respect to the axis of the insert member 28.

The body 18 has a tapered section 56 which is formed at the opening of the wall of the recess 29. The tapered section 56 and the outer circumferential surface of the inclined section 41 of the tube member are resin-welded by using a welding material 58 made of resin. Accordingly, the tube member 26 is in a state of being reliably prevented from disengagement from the recess 29 of the body 18.

As shown in FIG. 1, the fluid passages 14, 16 are bent upwardly at the inside of the body 18, and they communicate with a recess 60 which is formed over the body 18. A seat section 62 is formed at an opening of the first fluid passage 16. A step section 64 is formed on a wall of the recess 60. A diaphragm 66 is engaged with the step section 64. A thick-walled section 68 is formed at a central portion of the diaphragm 66. A flexible thin-walled section 70 is formed around the thick-walled section 68. Accordingly, the thick-walled section 68 is displaceable in the direction of the arrow A or B in accordance with the flexible bending of the thin-walled section 70. When the thick-walled section 68 is displaced in the direction of the arrow A, the thick-walled section 68 is seated on the seat section 62 to close the fluid passage 16. On the other hand, when the thick-walled section 68 is displaced in the direction of the arrow B, the fluid passage 14 communicates with the fluid passage 16. A resilient member 72, which is made of a material, for example, synthetic rubber or natural rubber and which is formed to have a ring-shaped configuration, is engaged with an upper surface of the thin-walled section 70.

A projection 76, which is fitted into the recess 60, is formed at a lower portion of the casing 22. The diaphragm 66 is interposed and supported by the projection 76 and the step section 64. A recess 78 is formed at a central portion of the projection 76. The recess 78 communicates with the outside of the casing 22 via a passage 80. In this arrangement, the passage 80 communicates with the atmospheric air, and it functions such that the air is introduced into the recess 78 or the air is discharged from the recess 78 when the thick-walled section 68 of the diaphragm 66 is displaced in the direction of the arrow A or B. The recess 78 communicates with a hole 82 which extends along the axis of the casing 22. The hole 82 communicates with a recess 84 which is formed at an upper portion of the casing 22. A piston 88, which constitutes the valve plug 20 and which has a flange 86 at its upper portion, is slidably inserted into the hole 82 and the recess 84.

The recess 84 is divided into a first chamber 85 disposed on the lower surface and a second chamber 87 disposed on the upper side by a packing member 96 which is provided on the flange 86. Ports 100, 102 communicate with the first chamber 85 and the second chamber 87 respectively. An upper portion of the thick-walled section 68 of the diaphragm 66 is fitted into a recess 90 which is formed at a lower end portion of the piston 88. A holding member 92, which opens increasingly in a trumpet-shaped configuration, is secured to a lower portion of the outer circumference of the piston 88. The holding member 92 functions such that it is engaged with the upper surface of the resilient member 72 to elastically hold the thin-walled section 70 of the diaphragm 66.

A packing member 94 for preventing any leakage of the pressure fluid is provided on the outer circumference of the piston 88. A damper 98 is provided at the bottom of the recess 84. A cylindrical projection 104 is formed at an upper portion of the flange 86.

The cover member 24 is formed with a fitting section 106 for being fitted into the recess 84. An O-ring 108 is provided on an outer wall of the fitting section 106 for preventing any leakage of the pressure fluid from the gap between the outer wall of the fitting section 106 and the wall of the recess 84. A damper 109 is provided at a lower portion of the fitting section 106. The fitting section 106 is formed with a recess 110. A first end of a first coil spring 112 is seated on the bottom of the recess 110. A second end of the first coil spring 112 is disposed and seated on an upper portion of the flange 86 at the outside of the cylindrical projection 104. A second coil spring 114, a first end of which is seated on the bottom of the recess 110, is provided at the inside of the first coil spring 112. A second end of the second coil spring 114 is disposed and seated on an upper portion of the flange 86 at the inside of the cylindrical projection 104.

The ON/OFF valve 10 based on the use of the tube connection structure 12 of the fluid pressure-operated apparatus according to the first embodiment is basically constructed as described above. Next, explanation will be made for a method for connecting the tube member 26 into the inside of the recess 29 of the body 18.

At the stage at which the tube member 26 is not connected to the body 18, the welding material 58 is not welded on the tapered section 56 of the body 18. Further, the insert member 28 is removed from the recess 29.

At first, the insert section 34 of the insert member 28 is inserted into the end of the tube member 26. In this method, the diametrally expanded section 39 may be formed by pressing and expanding the tube member 26 by using the tapered section 38. Alternatively, the diametrally expanded section 39 may be previously formed at the end of the tube member 26 by means of, for example, the flaring process, and then the insert section 34 of the insert member 28 may be inserted into the diametrally expanded section 39. The tube member 26 is inserted along the insert section 34 until the end of the tube member 26 abuts against the step section 35 of the insert member 28. At this stage, the insert member 28 is in a state of being detached from the recess 29. The operator is capable of visually observing the diametrally expanded section 39 inserted with the insert section 34. Therefore, the tube member 26 can be installed to the insert member 28 by a predetermined length reliably with ease.

Subsequently, the insert member 28 is fitted to the recess 29, and the tube member 26 is installed to the recess 29. At this stage, the end of the tube member 26 is supported by the insert member 28. Therefore, the tube member 26 can be easily installed to the recess 29. In this situation, the end of the tube member 26 is coupled to the insert section 34 until the end of the tube member 26 abuts against the step section 35 of the insert member 28. Therefore, the predetermined portion of the tube member 26 is reliably inserted into the recess 29, and hence any shortage of amount of insertion does not occur. In other words, the amount of insertion of the tube member 26 is previously set to be a predetermined amount by means of the insert member 28. Accordingly, it is possible to avoid any shortage of the amount of insertion of the tube member 26. Therefore, the tube member 26 is installed with sufficient tensile strength into the recess 29 of the body 18. Thus, it is possible to reliably prevent the tube member 26 from disengagement from the body 18.

The outer circumferential surface 40 of the expanded section 36 of the insert member 28 tightly contacts with the inner circumferential surface 42 of the recess 29, and it effects the sealing function. Accordingly, the fluid is reliably prevented from leakage to the outside of the body 18 from the fluid passages 14, 16.

Subsequently, the tapered section 56 of the body 18 and the outer circumferential surface of the tube member 26 are resin-welded by using the welding material 58. Accordingly, the tube member 26 is secured to the body 18. Thus, the tube member 26 is prevented from disengagement from the body 18. In this procedure, the resin-welding is effected on the inclined section 41 which is a portion different from the expanded section 36 to perform the sealing function.

Therefore, the sealing function is not effected, for example, by any dispersion of the welding operation. Thus, the sealing is reliably achieved.

The tube member 26 is installed to the inside of the recess 29 of the body 18.

Next, the operation of the ON/OFF valve 10 will be explained.

At first, a compressed air supply source 122 is connected via a selector valve 120 to ports 100, 102. The tube members 26, 26, which are connected to the tube connection structures 12, 12, are connected to a fluid supply source 124 and a supply object 126.

Figure 4:
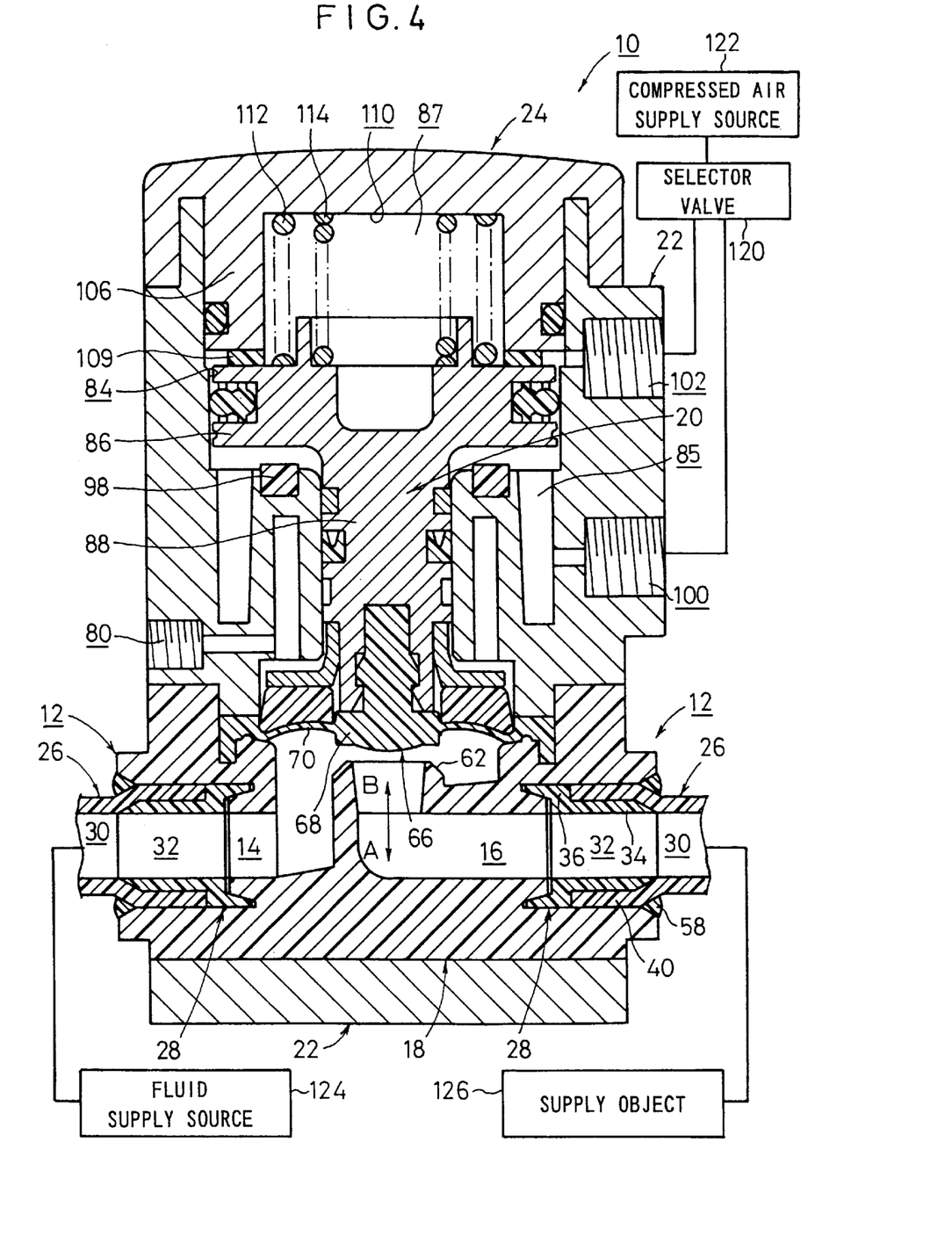
FIG. 4 shows a vertical sectional view illustrating a state of use of the ON/OFF valve shown in FIG. 1.

After completing the preparatory stage as described above, the selector valve 120 is switched to introduce the compressed air from the compressed air supply source 122 via the port 100 into the first chamber 85. Accordingly, as shown in FIG. 4, the piston 88 is displaced in the direction of the arrow B against the resilient force of the coil springs 112, 114. The thick-walled section 68 of the diaphragm 66 is separated from the seat section 62, and the fluid passage 14 communicates with the fluid passage 16. Therefore, the fluid is supplied from the fluid supply source 124 via the fluid passages 14, 16 to the supply object 126.

When the selector valve 120 is switched to introduce the compressed air from the compressed air supply source 122 via the port 102 into the second chamber 87, the piston 88 is displaced in the direction of the arrow A as shown in FIG. 1. Accordingly, the thick-walled section 68 of the diaphragm 66 abuts against the seat section 62, and the communication state between the fluid passages 14, 16 is blocked. Therefore, the supply of the fluid from the fluid supply source 124 to the supply object 126 is stopped.

Figure 5:
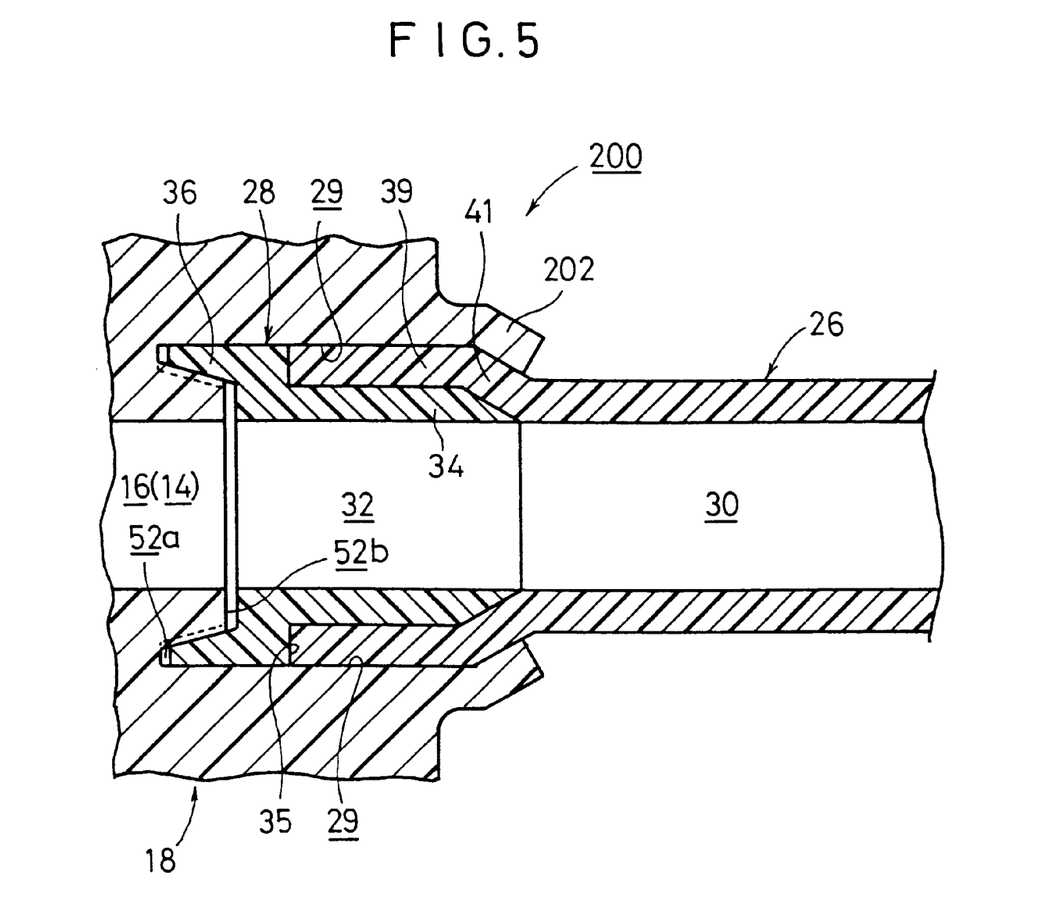
FIG. 5 shows a magnified longitudinal sectional view, with partial omission, illustrating a tube connection structure of a fluid pressure-operated apparatus according to a second embodiment of the present invention.

Next, a tube connection structure 200 of a fluid pressure-operated apparatus according to the second embodiment will be explained with reference to FIG. 5. The same constitutive components as those of the first embodiment are designated by the same reference numerals, detailed explanation of which will be omitted. The third and fourth embodiments, which will be described later on, will be explained in the same manner as described above.

The body 18 of the tube connection structure 200 is formed with an annular projection 202 which surrounds the opening of the recess 29 and which extends in an inclined manner along the inclined section 41 of the tube member 26.

Before the tube member 26 is installed to the tube connection structure 200, the annular projection 202 is not inclined, and it is formed linearly to extend in the axial direction of the recess 29. When the tube member 26 is installed, then the insert member 28 is inserted into the tube member 26, and the insert member 28 is fitted to the recess 29 to install the tube member 26 to the recess 29, in the same manner as in the first embodiment. After that, the annular projection 202 is heated and softened, and it is deformed along the inclined section 41 of the tube member 26 to melt and fuse the annular projection 202 and the inclined section 41. Thus, the tube member 26 is prevented from disengagement from the tube connection structure 200.

Figure 6:
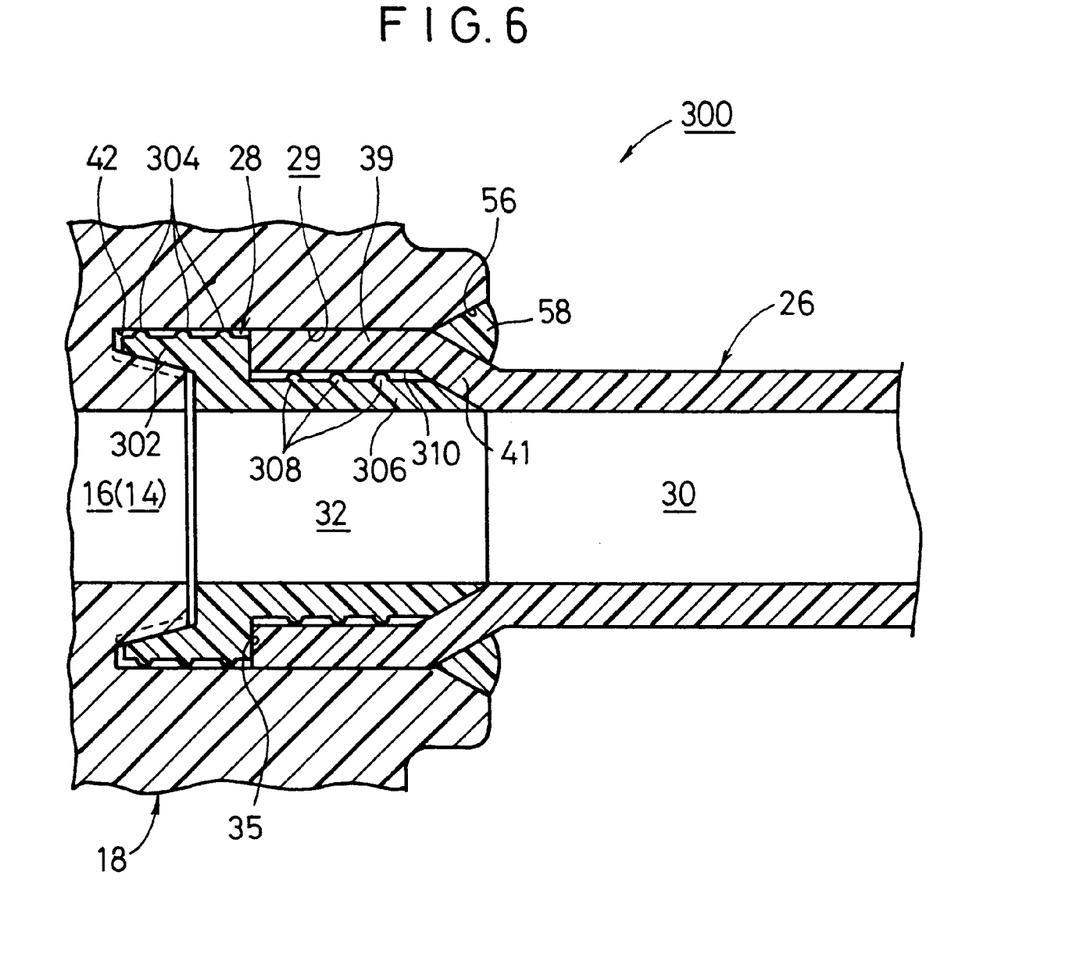
FIG. 6 shows a magnified longitudinal sectional view, with partial omission, illustrating a tube connection structure of a fluid pressure-operated apparatus according to a third embodiment of the present invention.

Next, a tube connection structure 300 of a fluid pressure-operated apparatus according to the third embodiment will be explained with reference to FIG. 6.

A plurality of annular projections 304 are formed on an outer circumference of an expanded section 302 of the insert member 28 for constructing the tube connection structure 300. The annular projections 304 abut against the inner circumferential surface of the recess 29 to prevent the fluid in the fluid passages 14, 16 from leakage to the outside of the body 18. A plurality of annular projections 308 are also formed on an outer circumference of an insert section 306 of the insert member 28. The annular projections 308 abut against the inner wall surface 310 of the tube member to prevent the fluid from leakage.

The tapered section 56 of the opening of the wall of the recess 29 and the outer circumferential surface of the inclined section 41 of the tube member 26 are resin-welded by using the welding material 58 made of resin. Accordingly, the tube member 26 is reliably prevented from disengagement from the recess 29 of the body 18.

Figure 7:
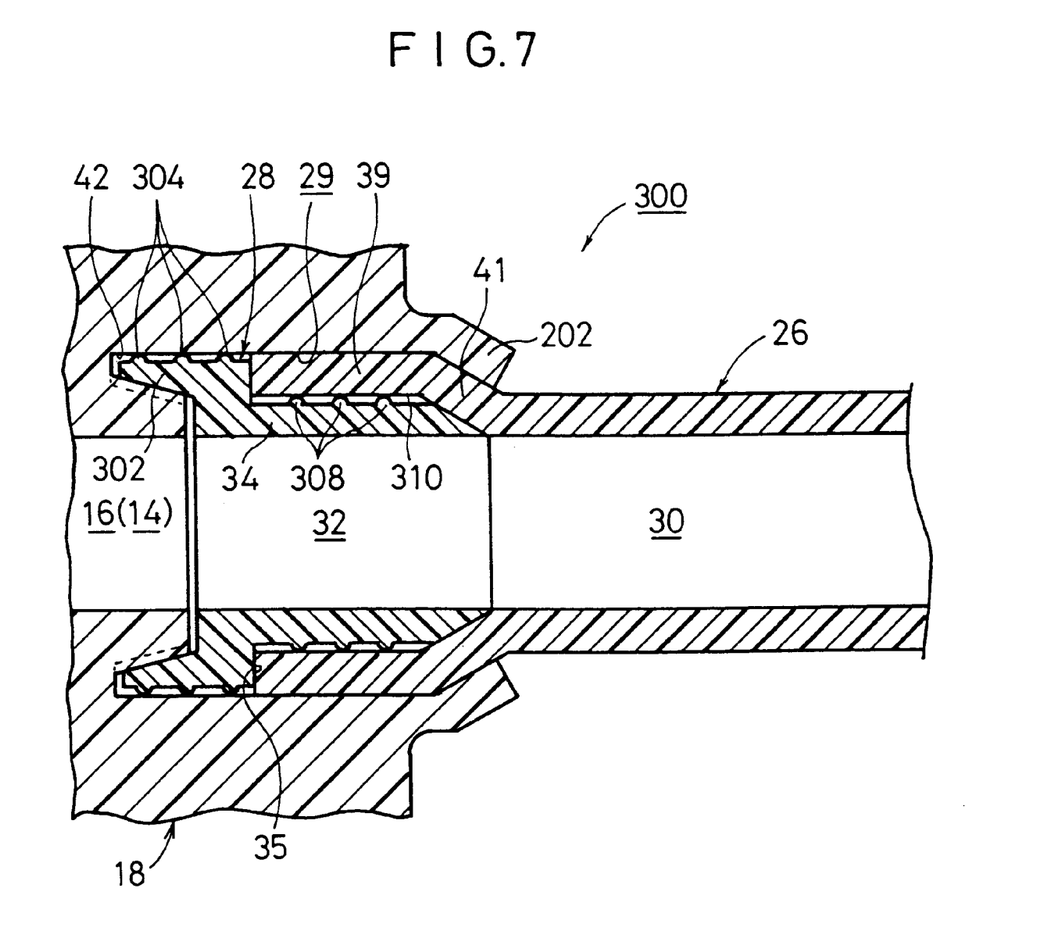
FIG. 7 shows a magnified longitudinal sectional view, with partial omission, illustrating a state in which an annular projection is formed in the tube connection structure shown in FIG. 6.

Alternatively, as shown in FIG. 7, the tube connection structure 300 according to the third embodiment may be also constructed as follows in the same manner as the tube connection structure 200 according to the second embodiment. That is, an annular projection 202 is formed to surround the opening of the wall of the recess 29 of the body 18. The annular projection 202 is deformed along the inclined section 41 of the tube member 26 to melt and fuse the annular projection 202 and the inclined section 41. Thus, the tube member 26 is prevented from disengagement from the tube connection structure 300.

Figure 8:
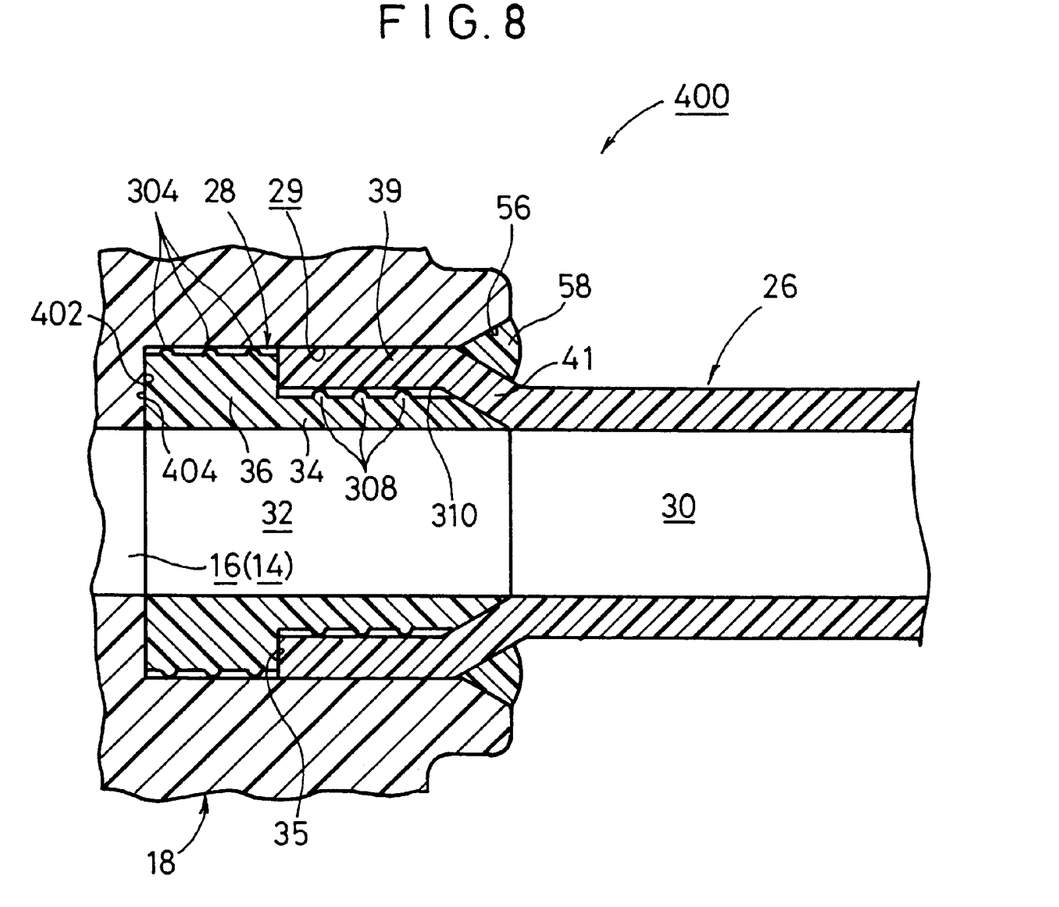
FIG. 8 shows a magnified longitudinal sectional view, with partial omission, illustrating a tube connection structure of a fluid pressure-operated apparatus according to a fourth embodiment of the present invention.

Next, a tube connection structure 400 of a fluid pressure-operated apparatus according to the fourth embodiment will be explained with reference to FIG. 8.

A side wall surface 402 for constructing the recess 29, which is formed on the body 18 of the tube connection structure 400, extends in the direction substantially perpendicular to the axis of the fluid passages 14, 16. On the other hand, an end surface 404, which extends in the direction perpendicular to the axis of the fluid passages 14, 16, is formed on the expanded section 36 of the insert member 28. The sealing function is effected by the abutment of the side wall surface 402 and the end surface 404. Thus, the fluid in the fluid passages 14, 16 is prevented from leakage to the outside of the body 18.

Further, the annular projections 304, 308, which are formed on the outer circumferences of the expanded section 36 and the insert section 34 of the insert member 28, abut against the inner circumferential surface 42 of the recess 29 and the inner wall surface 310 of the tube member 26 respectively, in the same manner as in the tube connection structure 300 according to the third embodiment. Thus, the fluid is prevented from leakage.

The body 18 has the tapered section 56 which is formed at the opening of the wall of the recess 29, in the same manner as in the tube connection structure 12 according to the first embodiment. The tapered section 56 and the outer circumferential surface of the inclined section 41 of the tube member 26 are resin-welded by using the welding material 58 made of resin. Accordingly, the tube member 26 is prevented from disengagement from the tube connection structure 400.

Figure 9:
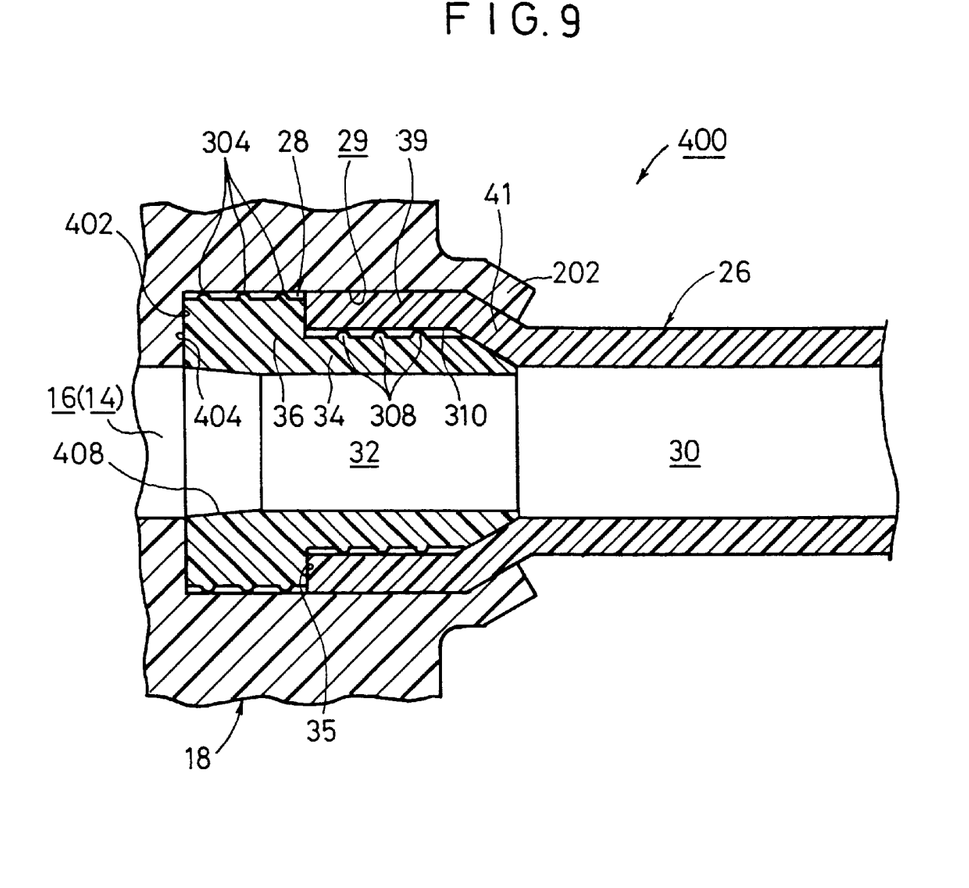
FIG. 9 shows a magnified longitudinal sectional view, with partial omission, illustrating a state in which an annular projection is formed in the tube connection structure shown in FIG. 8.

Alternatively, as shown in FIG. 9, the following arrangement is available in the same manner as in the tube connection structure 200 according to the second embodiment. That is, an annular projection 202 is formed to surround the opening of the wall of the recess 29 of the body 18. The annular projection 202 is deformed along the inclined section 41 of the tube member 26 to melt and fuse the annular projection 202 and the inclined section 41. Thus, the tube member 26 is prevented from disengagement from the tube connection structure 400.

In this arrangement, a tapered section 408, the diameter of which is gradually increased toward the fluid passage 14, 16, is formed on the passage 32 of the insert member 29. By doing so, even when any dimensional error exists in each of the diameters of the fluid passage 14, 16 of the body 18, the passage 32 of the insert member 28, and the passage 30 of the tube member 26, it is possible to permit the dimensional error. Thus, it is possible to suppress the formation of any liquid pool. In other words, the provision of the tapered section 408 on the insert member 28 interposed between the fluid passage 14, 16 of the body 18 and the passage 30 of the tube member 26 makes it possible to adjust, for example, the dimensional error between the fluid passage 14, 16 and the passage 30 of the tube member 26 by the aid of the tapered section 408 of the insert member 28 disposed at the intermediate position. Thus, it is possible to allow the fluid to smoothly flow along the mutually communicating passages 14, 16, 32, 30 without forming any liquid pool.

What is claimed is:

1. A tube connection structure of a fluid pressure-operated apparatus, comprising:

a body which is formed of a resin-material, which constitutes said fluid pressure-operated apparatus, and which is formed with a fluid passage;

an insert member which is fitted to a recess formed at an opening of said fluid passage, which is formed with a passage for making communication with said fluid passage, and which is inserted into one end of a tube member composed of a resin material, wherein:

said insert member is formed with a step section for making abutment against said one end to regulate an amount of insertion of said tube member, and said tube member and said body are connected by resin-welding said opening of said fluid passage and said tube member, and said insert member has an expanded section formed to expand radially outwardly therefrom, and a sealing function is effected by an outer circumferential surface of said expanded section and an inner circumferential surface of said recess.

2. A tube connection structure of a fluid pressure-operated apparatus, comprising:

a body which is formed of a resin-material, which constitutes said fluid pressure-operated apparatus, and which is formed with a fluid passage:

an insert member which is fitted to a recess formed at an opening of said fluid passage, which is formed with a passage for making communication with said fluid passage, and which is inserted into one end of a tube member composed of a resin material, wherein:

said insert member is formed with a step section for making abutment against said one end to regulate an amount of insertion of said tube member, and said tube member and said body are connected by resin-welding said opening of said fluid passage and said tube member, and said insert member has an expanded section formed to expand radially outwardly therefrom, an annular projection is formed on said expanded section, and a sealing function is effected by abutment of said annular projection against an inner circumferential surface of said recess.

3. A tube connection structure of a fluid pressure-operated apparatus, comprising:

a body which is formed of a resin-material, which constitutes said fluid pressure-operated apparatus, and which is formed with a fluid passage:

an insert member which is fitted to a recess formed at an opening of said fluid passage, which is formed with a passage for making communication with said fluid passage, and which is inserted into one end of a tube member composed of a resin material, wherein:

said insert member is formed with a step section for making abutment against said one end to regulate an amount of insertion of said tube member, and said tube member and said body are connected by resin-welding said opening of said fluid passage and said tube member, and said insert member has an expanded section formed to expand radially outwardly therefrom, and a sealing function is effected by abutment of an end surface of said expanded section against a side wall surface of said recess.

4. A tube connection structure of a fluid pressure-operated apparatus, comprising:

a body which is formed of a resin material, which constitutes said fluid pressure-operated apparatus, and which is formed with a fluid passage; and an insert member which is fitted to a recess formed at an opening of said fluid passage, which is formed with a passage for making communication with said fluid passage, and which is inserted into one end of a tube member composed of a resin material, wherein:

said insert member is formed with a step section for making abutment against said one end to regulate an amount of insertion of said tube member, said body is formed with an annular projection which surrounds an opening of a wall of said recess and which extends along an outer wall of said tube member, and said tube member and said body are connected by deforming said annular projection to melt and fuse said annular projection to said outer wall of said tube member.

5. The tube connection structure of said fluid pressure-operated apparatus according to claim 4, wherein said insert member has an expanded section formed to expand radially outwardly therefrom, and a sealing function is effected by an outer circumferential surface of said expanded section and an inner circumferential surface of said recess.

6. The tube connection structure of said fluid pressure-operated apparatus according to claim 4, wherein said insert member has an expanded section formed to expand radially outwardly therefrom, an annular projection is formed on said expanded section, and a sealing function is effected by abutment of said annular projection against an inner circumferential surface of said recess.

7. The tube connection structure of said fluid pressure-operated apparatus according to claim 4, wherein said insert member has an expanded section formed to expand radially outwardly therefrom, and a sealing function is effected by abutment of an end surface of said expanded section against a side wall surface of said recess.

* * * * *